May 16, 1933.  W. A. OGLESBEE  1,909,068
TAP CHANGER CONTROL SYSTEM
Filed Oct. 3, 1931
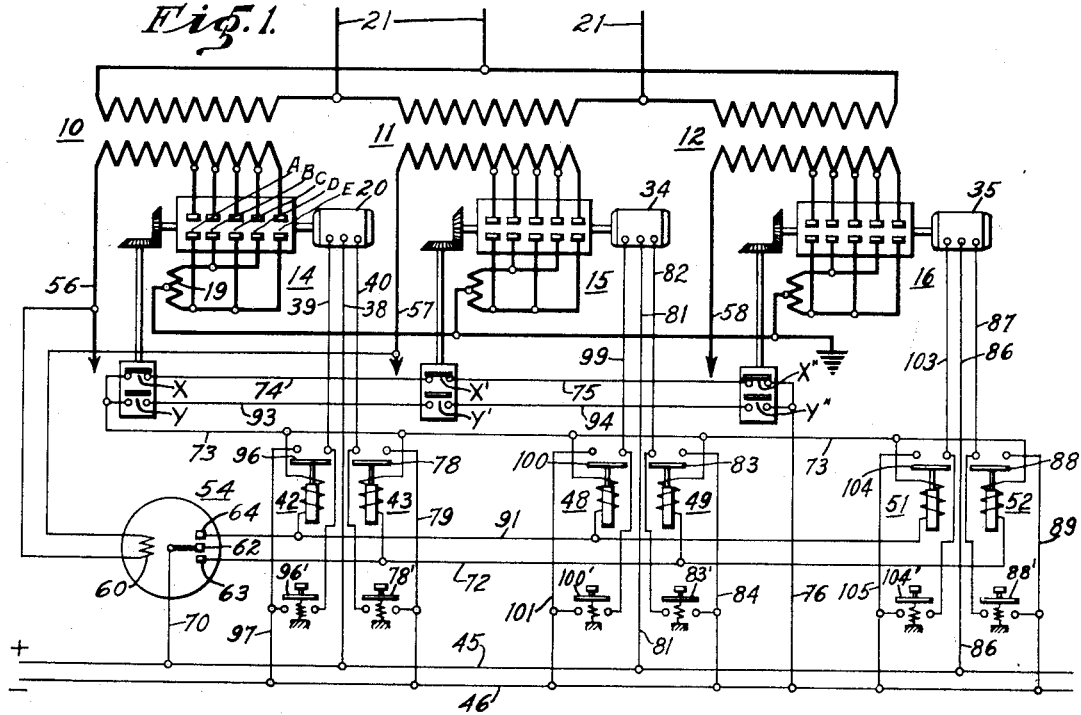
Fig.1.
Fig.2.
Sequence Chart
| Tap Changer Position | Main Switches | | | | | Out-of-Step Sws. | |
|---|---|---|---|---|---|---|---|
| | A | B | C | D | E | X | Y |
| 1 | o | | | | | o | |
| 2 | o | o | | | | | o |
| 3 | | o | | | | o | |
| 4 | | o | o | | | | o |
| 5 | | | o | | | o | |
| 6 | | | o | o | | | o |
| 7 | | | | o | | o | |
| 8 | | | | o | o | | o |
| 9 | | | | | o | o | |
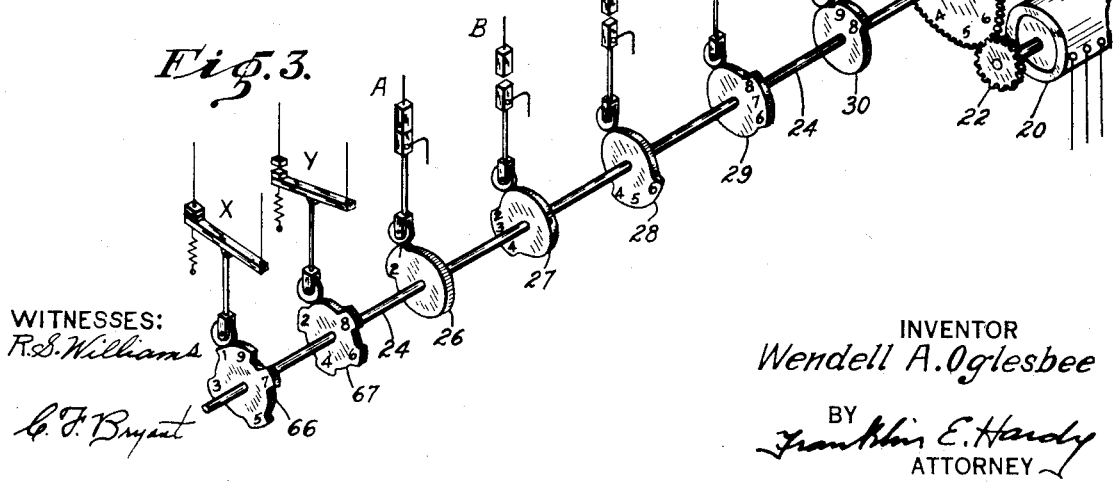
Fig.3.
WITNESSES:
R. S. Williams
C. F. Bryant
INVENTOR
Wendell A. Oglesbee
BY
Franklin E. Hardy
ATTORNEY Patented May 16, 1933

1,909,068

UNITED STATES PATENT OFFICE

WENDELL A. OGLESBEE, OF SHARON, PENNSYLVANIA, ASSIGNOR TO WESTINGHOUSE ELECTRIC & MANUFACTURING COMPANY, A CORPORATION OF PENNSYLVANIA

TAP-CHANGER CONTROL SYSTEM

Application filed October 3, 1931. Serial No. 566,622.

My invention relates to transformer tap changers and has particular relation to means for preventing the operation of a tap-changer group comprising a plurality of parallel-operated units when one of the units falls out of step with the others.

One typical application to which my invention is particularly well adapted, involves tap-changing under-load equipments utilized with the transformers of a polyphase power system, in which it is customary to provide each of the several phases of the system with a separate tap-changing unit, and, in the case of the usual balanced-load systems, to arrange for parallel operation the operating means of the several units. Such an arrangement functions satisfactory as long as all of the units operate in step. However, should one of them fall out of step, because of an operating-means fault or for any other reason, it is essential that further operation of all units be prevented until the faulty unit has been brought back into step with the other units, otherwise the unbalance in phase voltage between the several units may be increased to such a degree as to cause undesirable operating characteristics of the system.

My invention is directed to a solution for this problem, peculiar to the operation of a plurality of single-phase tap-changing underload mechanisms, and prevents the several mechanisms from operating should one of them get out-of-step with the others or stop on a tap position different from that of the others, because of different operating-motor speeds or of the complete failure of a motor to operate.

It is accordingly an object of my invention to provide means for detecting an out-of-step condition of any one of a plurality of parallel-operated tap changing units, and for preventing the further operation of the entire group until the out-of-step condition has been corrected.

It is another object of my invention to provide an out-of-step protective scheme for parallel-operated tap-changing underload mechanisms which can be readily combined with a wide variety of different operating-means control schemes.

It is an additional object of my invention to provide a protective scheme of the type described, which is simple in design, low in cost, positive in operation, and which is applicable to automatic as well as to manually-operable control systems for the tap-changing units.

It is a further object of my invention to provide a system of electrical interlocking which, when applied to the control circuits of a plurality of parallel-operated tap changers will serve as an out-of-step protective means, will require no additional relays, and will necessitate no undue complication of the control wiring.

In practicing my invention, I provide with each of the plurality of parallel-operated tap-changing mechanisms or units, tap-position-responsive switching means which are so interconnected with the operating-means of the control circuits of all the units that these circuits will all be de-energized when one tap-changing mechanism gets one operative step away from the others. Further operation of the units, which would result in additional unbalance of voltage, is thereby prevented, because it becomes impossible to energize any of the tap-changing unit operating means until readjustment of the faulty unit to the in-step position is effected.

My invention will best be understood by a description of a specific embodiment thereof when taken in conjunction with the accompanying drawing, in which Figure 1 is a diagrammatic view of apparatus and circuits arranged in accordance with one form of my invention, illustrated as applied to effect out-of-step protection for three parallel-operated single-phase tap-changing units associated with a three-phase transformer bank.

Fig. 2 is a sequence chart showing tap-changing switch operations for each of the units shown in the system of Fig. 1, and Fig. 3 is a simplified representation of out-of-step protective switches operated in accordance with the tap positions of the power-circuit tap switches of one well known form of tap-changing mechanism.

Referring to the drawing, and particularly to Fig. 1 thereof, three single-phase transformers 10, 11 and 12 are connected with a three-phase power circuit in the manner shown. Each transformer is provided with a tap-changing under-load mechanism, these mechanisms being respectively shown at 14, 15 and 16. As illustrated, each mechanism comprises a plurality of selectively operable switches, those associated with the unit 14 being designated as A, B, C, D and E, and connected with taps from one of the windings of the transformer 10. A preventive autotransformer 19 is associated in a well known manner with these tap-changing switches.

It will be assumed that power-circuit conductors 21 are connected to a source of three-phase power of fluctuating voltage and that it is desired to maintain constant the voltage supplied, through the transformer bank, to power-circuit conductors 56, 57 and 58. In such a case, the tap-changers may be utilized to adjust the ratio of transformation to suitably compensate for the supply fluctuations.

To operate the tap-changing mechanism 14, a motor 20 is provided. As illustrated in the sequence chart in Fig. 2, the tap-changer provides nine different effective tap connections or positions, the circles opposite the several numbered positions showing which of the five switches of the mechanism for these respective tap positions are in their circuit-closing positions. One means for mechanically operating these switches in accordance with the sequence given in Fig. 2 is indicated in Fig. 3. As shown in Fig. 3, operating motor 20 drives, by means of gear wheels 22 and 23, a shaft 24 which carries cams 26, 27, 28, 29 and 30, associated, respectively, with main switches A, B, C, D and E in the manner shown.

In Fig. 3 the cam shaft 24 is shown in the particular rotative position in which the switch A only is closed. This is position 1 on the chart of Fig. 2, as is indicated in Fig. 3 by the 1 position marking on the main-gear wheel 23 with reference to a stationary element 32, or other equivalent position-indicating means. Rotation of the cam shaft 24 in a clockwise direction through an angle of 40° moves the mechanism to position 2 in which the switch B is also closed, and further rotation of the shaft to the succeeding positions effects the other closure combinations shown in Fig. 2.

Tap-changer units or mechanisms 15 and 16 are similar to mechanism 14 just described, respectively comprising operating motors 34 and 35 disposed to selectively close the main power switches of the units.

Motors 20, 34 and 35 may be of any suitable type capable of reversible operation. As illustrated, in the case of motor 20, for example, which may be of the well known split-field series type, energization of the motor from a direct-current source through conductors 38 and 39 causes the motor to operate the tap changer 14 in a voltage-raising direction, in which the tap positions are changed in a direction from position 1 toward position 9. Likewise, the energization of the motor through conductors 38 and 40 operates the mechanism in a voltage-lowering direction, in which the tap positions are changed in a direction from the position 9 towards the position 1. Motors 34 and 35 operate in a manner similar to that explained for motor 20.

To control the operation of tap-changer motor 20 of unit 14 in the voltage-raising and voltage-lowering directions, respectively, two relays 42 and 43 may be utilized. Energization of the operating winding of each relay actuates a contact member thereof upwardly to complete an operating circuit for the motor. As shown, this circuit is energized from direct-current control-circuit conductors 45 and 46.

In a similar manner the motor 34 of the tap-changing unit 15 is controlled in the raise and lower directions by relays 48 and 49, and motor 35 of the tap-changing unit 16 is controlled by relays 51 and 52.

The energization of the motor-control relays of the several tap changer units, if effected simultaneously, will result in parallel operation of the units. Such energization may be controlled either manually, as by the closure of a suitable switch or push button device, or automatically, as by means of a contact-making voltmeter or other instrument responsive to an electrical characteristic of the main power circuit in which the tap changers operate. As illustrated, such control is effected in the system of Fig. 2 by means of a contact-making voltage-responsive device 54, which causes the tap-changing mechanisms 14, 15 and 16 to be operated in such manner that the voltage between the power circuit conductors 56, and 57, from which the winding 60 of the instrument 54 is energized, will be maintained constant.

In operation, the device 54, when a voltage of the desired value is impressed upon winding 60, the movable contact member 62 is caused to occupy the mid or disengaged position shown. A rise in the voltage causes the contact member 62 to move downwardly into engagement with a stationary contact member 63, and a fall in voltage causes the contact member 62 to move upwardly into engagement with a second stationary contact member 64.

Thus, a decrease in the voltage of the main power circuit completes an energizing circuit for raise motor-control relays 42, 48 and 51, which results in motors 20, 34 and 35, respectively, being operated to move the tap-changer units to a higher tap position, in which the voltage of the output circuit will be raised. Similarly, an increase in the power-circuit voltage completes an energizing circuit for lower motor-control relays 43, 49 and 52, which causes the operating motors of the tap changer units to operate the tap changers to a lower-numbered tap position in which the voltage of the power circuit is appropriately lowered. When the desired correction is made, the contact members of the device 54 are disengaged.

It will be understood that means for effecting the completion of a tap-changing operation from one tap changing position to the next position, after the motors have been started may be incorporated in the motor control systems. Since such means are well known in the art, and form no part of this invention, they are not illustrated in the system of Fig. 1, in order that needless complication of the drawing may be avoided.

To prevent operation of the several units in the event that one of them falls out of step with the other two, each unit is provided with a pair of control-circuit interlocking switches, the switches X and Y being provided for the unit 14, X' and Y' for the unit 15, and X" and Y" for the unit 16. As illustrated, these switches are mechanically connected to the operating mechanism of their associated tap changer units in such manner that switches X, X' and X" will be closed for the odd-numbered tap positions and opened for the even-numbered tap positions, while the switches Y, Y' and Y" will be closed for the even-numbered tap positions and opened for the odd-numbered tap positions.

One method of attaining this operation is illustrated in Fig. 3, in which switches X and Y are respectively operated by cams 66 and 67, carried upon the main cam shaft 24 and so positioned and shaped that the desired sequence of operation named will be attained. The sequence of operation of the switches X and Y, is also shown by the chart of Fig. 2.

It will be understood that these out-of-step protective switches X and Y may be of any suitable form closeable for alternate tap positions, and need not be of the particular construction illustrated in the drawing. Thus, in addition to the cam-operated type shown, they may, for example, be of the rotary multi-point variety, gear driven from the main cam shaft in such manner that the desired circuit completions and interruptions outlined will be effected.

As illustrated in Fig. 1, switches X, X' and X" are connected in series-circuit relation, switches Y, Y' and Y" are similarly connected, and both groups are disposed in the tap-changer relay control circuits in such manner that energization of these circuits can be effected only when all of the switches in one or the other of the two series-connected groups are closed. By this means, as has been pointed out, an out-of-step position of any one of the tap changers is at once detected and further operation of the units prevented, since energization of the control circuits is made impossible until all of the units have been restored to the in-step tap position.

In operation of the system shown and described, if, when all the tap-changer units are in similar intermediate odd-numbered tap positions, a voltage-lowering operation is initiated by the device 54 by the engagement of contact members 62 and 63, the out-of-step switches X, X' and X" will all be closed, and the switches Y, Y' and Y" will all be in their open position, as illustrated in Fig. 1. There will thus be established an energizing circuit for the "lower" motor-control relays 43, 49 and 52 which extends from the positive conductor 45 through conductor 70, contact members 62 and 63, conductor 72, the operating windings of relays 43, 49 and 52 in parallel-circuit relation, conductor 73, switch X, conductor 74, switch X', conductor 75, switch X" and conductor 76 back to negative conductor 46.

Thus energized, the motor-control relays above-named, close their respective control circuits, the relay 43 completing an energizing circuit for the motor 20 which extends from the positive conductor 45 through conductor 38, the windings of motor 20, conductor 40, contact member 78 of relay 43, and conductor 79 back to negative conductor 46 to operate the motor in a voltage lowering direction. The relay 49 similarly completes an energizing circuit for the motor 34, which extends from the positive conductor 45 through conductor 81, the windings of motor 34 to operate it in a voltage lowering direction, conductor 82, contact member 83 of relay 49, and conductor 84 back to the negative conductor 46. Likewise the relay 52 energizes the motor 35 through a circuit which extends from the positive conductor 45, through conductor 86, windings of the motor 35 to operate it in a voltage lowering direction, conductor 87, contact member 88 of relay 52, and conductor 89 back to the negative conductor 46.

Thus energized, motors 20, 34 and 35 operate tap changers 14, 15 and 16 in the voltage lowering direction or to a lower numbered position. Assuming the tap changers remain in step, the operation of all of them to an even-numbered tap position effects the closure of switches Y, Y' and Y", which take the place of switches X, X' and X" in the relay control circuit these latter switches being now opened so that energization of the control circuits will be continued and the operation of tap changers will proceed until the desired change of voltage has been effected, and the contact members 62 and 63 of device 54 become disengaged.

Similarly, if the several units are all on a similar even-numbered tap position, and the device 54 acts to effect a closure of contact members 62 and 64, an energizing circuit for the motor-control relays 42, 48 and 51 will be completed. This circuit extends from the positive conductor 45 through conductor 70, contact members 62 and 64 of the device 54, conductor 91, the operating windings of relays 42, 48 and 51, in parallel-circuit relation, conductor 73, switch Y of unit 14, conductor 93, switch Y' of unit 15, conductor 94, switch Y" of unit 16, and conductor 76 back to negative conductor 46.

Thus energized, the motor-control relay 42 closes an operating circuit for the motor 20 which extends from the positive conductor 45 through conductor 38, the windings of motor 20 to operate in a voltage raising direction, conductor 39, contact member 96 of relay 42, and conductor 97 back to the negative conductor 46. Similarly, the relay 48 energizes the motor 34 through a circuit which extends from positive conductor 45, through conductor 81, the operating windings of motor 34 to operate the motor in a voltage raising direction, conductor 99, contact member 100 of relay 48, and conductor 101 back to the negative conductor 46. Likewise, the relay 51 energizes the motor 35 through a circuit which extends from positive conductor 45, through conductor 86, the raise operating windings of motor 35, conductor 103, contact member 104, relay 51, and conductor 105 back to the negative conductor 46.

Thus energized, the motors operate the tap changers in the voltage-raising direction to move them to similar higher numbered tap positions. As the units are advanced to an even-numbered tap position, switches X, X' and X" are closed thus closing a circuit in shunt relation to the switches Y, Y' and Y", which are opened, so that the connection of the relay to the conductor 46 is continually maintained.

It will be apparent that such energization may be continued as long as all of the units remain in step regardless of what the particular number of such step is, or what the direction of change may be. However, should one of the units fall out of step by one position, the circuit through the "out-of-step" switches will be interrupted. For example, if units 14 and 16 move from an odd to an even numbered position, while unit 15 remains in the odd numbered position, switches Y and Y" will be closed, but switch Y' remaining open, there will be no completion of the energizing circuit from conductor 73 to conductor 76. Similarly, if units 14 and 16 move from an even to an odd numbered position and unit 15 remains on an even-numbered position, switches X and X" will be closed, but since switch X' of unit 15 is open there will still be no connection from conductor 73 to conductor 76, and energization of the motor-control relays will then be made impossible. It will be apparent that the same condition applies regardless of which one of the units falls out of step with respect to the other two.

For such an "out-of-step" condition, it is necessary to move the irregular unit back to the "in-step" position before energization of the motor control relays can again be effected. Such individual unit position adjustment may be accomplished in any suitable manner as, for example, by the provision of manually-operable push buttons 96', 78', 100', 83', 104' and 88', connected in parallel with the comparably-numbered contact members of the several motor-control relays.

Thus, for example, if unit 14 is out-of-step, and it is desired to operate it one position in the voltage-raising direction, control pushbutton 96' may be depressed for a period sufficient to effect the necessary operation of the tap changer. Similarly, a depression of push button 78' will effect the individual operation of tap changer 14 in the voltage-lowering direction.

Although a rather simple form of fundamental control circuit for the tap-changer operating motors has been illustrated, such a selection having been made for the purpose of simplifying the explanation of those portions of the control-system which do not in themselves form a part of this invention, it will be apparent, that the out-of-step protective system of my invention is also applicable to the more complicated varieties of control circuits which are now known and extensively utilized in the art. Similarly, it will be evident that the invention is applicable to tap changers of other types than illustrated, and that it is applicable to manual as well as to automatic control of the operating means.

Although I have shown and described a certain specific embodiment of my invention, I am fully aware that many modifications thereof are possible. My invention, therefore, is not to be restricted except insofar as is necessitated by the prior art and the scope of the appended claims.

I claim as my invention:

1. In combination with a plurality of tap-changing units and individual operating means therefor, control circuits for each of said operating means, out-of-step operation-preventing means comprising a pair of switches operated by each of said units, one switch of each pair being closed in the even-numbered tap positions of its associated unit and open in the odd-numbered tap positions the other switch of each pair being closed in the odd-numbered tap positions of the unit and open in the even-numbered tap positions, the said first-named switch of each of the several pairs being connected in series-circuit relation to form one group and the said second-named switch of each pair being connected in series-circuit relation to form a second group, said two groups of series-connected switches being so associated with the control circuits of said tap-changing unit that energization thereof is effected through the one or the other of said switch groups.

2. In combination with a plurality of tap-changing units operating in a group, each of said units having separate operating means and control circuits therefor, means for interrupting the operation of said units in the event that one of them falls out of step with the other comprising a pair of switches actuated by each unit in a manner that the first switch of each pair is closed and the second opens on alternate tap position of the unit and the second switch of each pair is closed and the first opens on the remaining alternate positions, the first-named switches for all units being connected in series-circuit relation, the second-named switches for all units being connected in series-circuit relation, said two series-connected switch groups being connected in parallel-circuit relation, and means for energizing the control circuits of the operating means of said tap-changing units through the one or the other of said two series-connected switch groups.

3. In a system comprising a plurality of cooperating tap-changing units having separate operating means and control circuits therefor, a source of power for operatively energizing the control circuits of all of said units, and out-of-step operation preventing means comprising a switching device actuated by each of such units, said several switching devices being connected in series-circuit relation intermediate said source of power and the control-circuits of all of said units and so disposed that when similarly actuated substantially simultaneously the said control circuits will thereby be maintained operatively energized and when actuated out-of-step with one another the said operative energization of all of the control circuits will thereby be interrupted.

In testimony whereof, I have hereunto subscribed my name this 28th day of September, 1931.

WENDELL A. OGLESBEE.